July 13, 1943.  A. L. LANGEL  2,323,922
MULTIPLE BAKING PAN
Filed Aug. 25, 1941  2 Sheets-Sheet 1
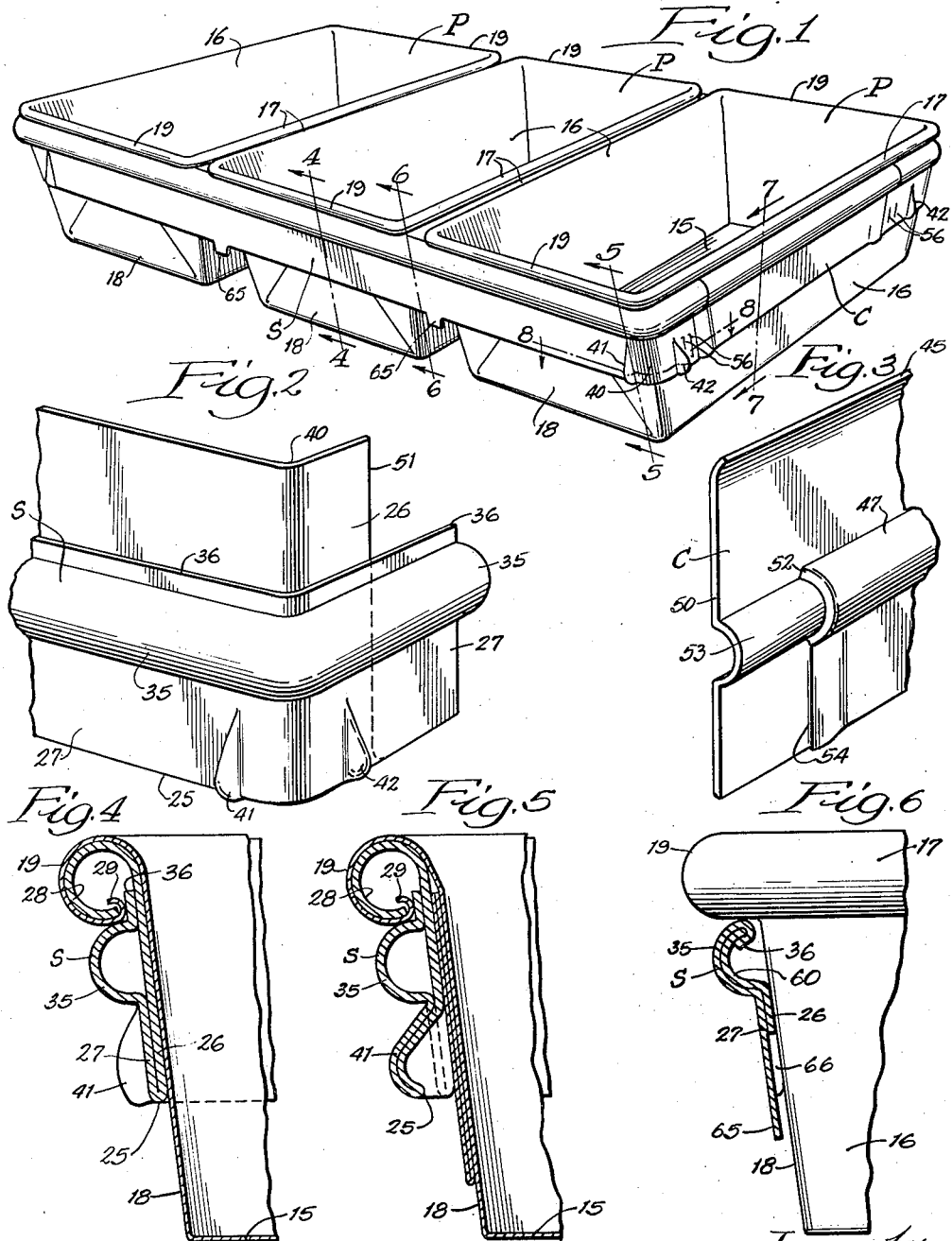

July 13, 1943.  A. L. LANGEL  2,323,922
MULTIPLE BAKING PAN
Filed Aug. 25, 1941  2 Sheets-Sheet 2
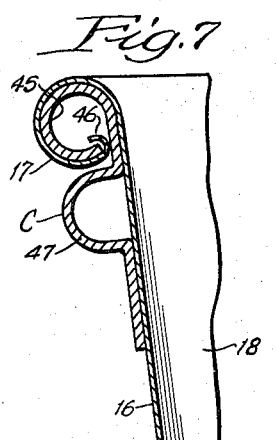
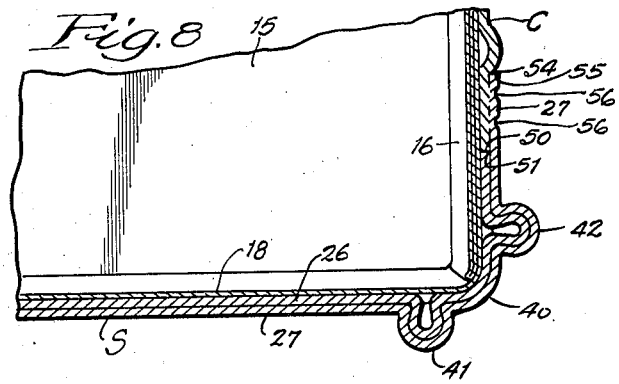
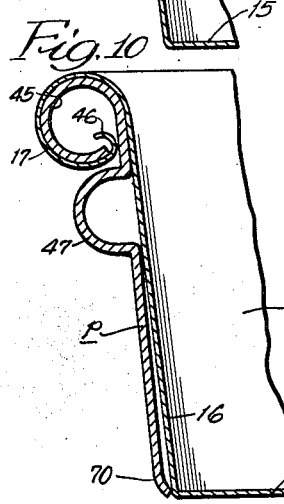
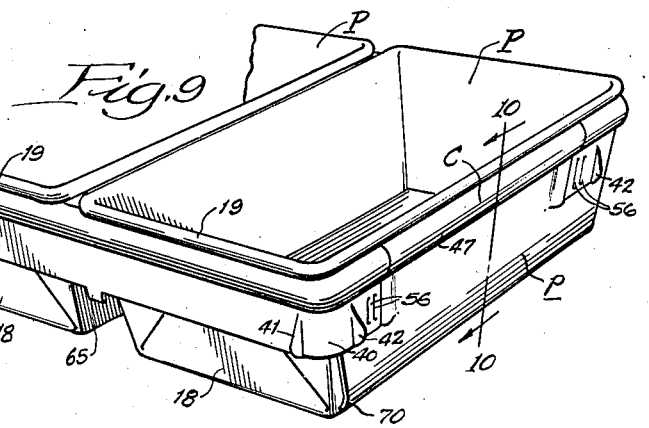
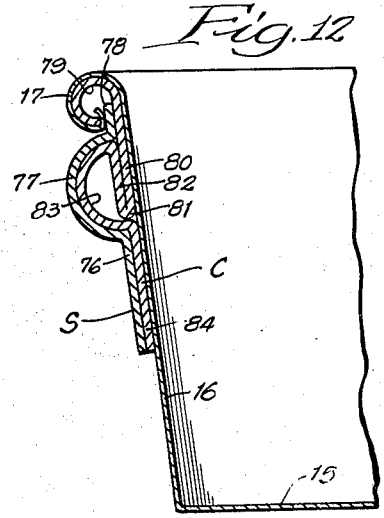
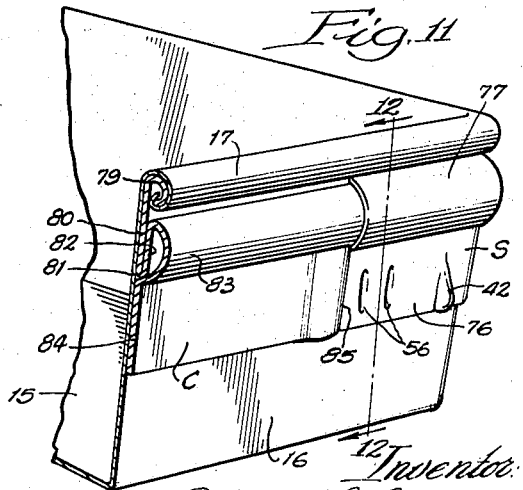

Patented July 13, 1943

2,323,922

UNITED STATES PATENT OFFICE 2,323,922

MULTIPLE BAKING PAN

Adrien L. Langel, Chicago, Ill., assignor to Chicago Metallic Manufacturing Company, Chicago, Ill., a corporation of Illinois Application August 25, 1941, Serial No. 408,203

7 Claims. (Cl. 53—6)

My present invention is concerned with a multiple baking pan, and particularly with the means by which the several pans in the set are united together. For its object my invention aims to provide between the pans in the set an interconnection which is simple, inexpensive, sturdy, and protective of the pans to which it is joined, and which cooperates effectively with pans whose sides and ends are outwardly inclined.

In the accomplishment of these ends I utilize a strapping, of iron or steel, of several connected sections certain of which, extending along the sides of the pan set, are reversely bent in a lengthwise direction to provide two plies integrally united by a fold along the bottom edge. The strapping so folded is disposed flatwise along the aligned ends of the combined pans and near its opposite ends is turned through 90° to lap around the corners and rest against the ends of the pan set. With such a two-ply strapping I provide an interlock between the inner ply and the upper edge of the pan ends with which it is engaged, the interlock being in the form of a two-ply rolled bead which furnishes a substantial protection to the pan edges. In such a construction, moreover, the outer ply of the strapping may also coact with the rolled bead to enhance the strength thereof by providing in itself an outturned rib extending parallel therewith and adjacent thereto. As a further feature of construction I provide adjacent the corners of the pan set certain lugs extending crosswise of the strapping and of progressively increasing cross sectional area toward the folded lower edge thereof, these lugs being produced as bosses from surplus material in both plies of the strapping itself. With a two-ply strapping as just described I associate connector straps one extending along each end of the pan set and each interlocked with a rolled bead along the pan edge adjacent thereto, these connectors being so formed as to interfit with the turned ends of the two-ply straps to which they are connected and also to furnish abutments for coaction therewith. The connectors themselves may be formed with outwardly extended ribs lying parallel with and adjacent to the rolled edges of the pans adjacent the ends of the set so as to furnish a reinforcement therefor.

All such features of construction are embodied into the pan set of this invention of which certain suggestive embodiments are set forth in the accompanying drawings in the manner following:

Figure 1 is a perspective view of a pan set connected together by strapping having the improvements of this invention;

Fig. 2 is an enlarged fragmentary detail in perspective of the angled end of one of the straps, showing the upper edge of its inner ply in its initial state;

Fig. 3 is a similar view of the coacting end of one of the end connectors;

Figs. 4–7 are transverse sectional views, each on an enlarged scale, taken, respectively, on lines 4—4, 5—5, 6—6, and 7—7 of Fig. 1;

Fig. 8 is a detail in horizontal section, taken on line 8—8 of Fig. 1;

Fig. 9 which is a view similar to Fig. 1, except for its fragmentary character, shows an end connector modified to provide a protection plate;

Fig. 10 is a vertical section, on an enlarged scale, taken on line 10—10 of Fig. 9;

Fig. 11 is a fragmentary perspective view of one corner of a pan set in which a further modified form of connector is used; and Fig. 12 is a detail in vertical section taken on line 12—12 of Fig. 11.

In the showing of Fig. 1 three pans P are combined into a set to be handled as a unit. These pans which are alike comprise in each instance a sheet metal bottom 15 from opposite edges of which rise sides 16 which along their upper edges 17 are curled outwardly, downwardly and then inwardly (see Fig. 7). Also rising from other opposite edges of the pan bottom are ends 18 which are similarly formed at their upper edges 19 where the material is curled outwardly, downwardly and inwardly (see Figs. 4 and 5). Both the side and end walls are desirably inclined outwardly to a slight extent to facilitate nesting of one pan set with another.

The means by which several pans may be united into a set, with the pan end walls aligned to form the sides of the pan unit, comprises a pair of straps S, one extended along each side of the pan set, together with a pair of connectors C, one extended along each end of the pan set. Each strap is bent upon itself at 25 to form a lower folded edge from which rises two plies 26 and 27, the former, to the inside of the other, being adapted to rest flatwise against the ends of several pans with which it is in connection. The upper edge of this ply which initially stands above the outer ply 27 (see Fig. 2), is adapted to be curled outwardly, downwardly and then inwardly, thereby providing, in effect, a rolled bead 28 which lies inwardly of the curled upper edges 19 of the adjacent end walls of the pans. As appears best in Figs. 4 and 5, the extremity 29 of each pan end wall may be extended beyond the proximate edge of the inner ply of the strap so as to lie to the inside thereof.

The outer ply of each strap is desirably formed with an outwardly protruding rib 35 which underlies the interlocked curled edges of the pan walls in close proximity thereto. The upper edge 36 of the outer ply of the strap is adapted to lie within the gap between the inner ply and the interlocked curled edges of the pan ends.

Each strap executes a bend 40 of around 90° at points opposite the ends of the pan set so as to extend around two corners thereof. Beyond the corner bends each end of the strap inner ply 26 terminates short of the outer ply 27 so as to be lapped thereby (see Fig. 2). In addition, the excess of material resulting from each bend adjacent plies which are inclined substantially in conformity with the sides and ends of the several pans, is disposed in one or more embossed lugs, two being illustrated, one 41 near the corner bend 40 on the long face of the strap and the other 42 just around the corner therefrom, these two bosses extending upwardly from points adjacent the lower folded edge of the strap. As shown, each boss is of generally bowed contour, lengthwise of the strap, and its outward bulge increases toward its lower end which lies approximately opposite the folded lower edge of the strap. If desired, each boss may be turned inwardly adjacent its lower end to substantially close off the space within the boss.

The straps just described are alike, one being extended along each of the two longer sides of the pan set. A pair of connectors C may be utilized to interconnect the straps between their spaced ends which confront each other when disposed against the end walls of the pan set. These connectors, which are alike, will now be described.

As shown best in Fig. 3, each connector is in the form of a single ply strap adapted to be rested flatwise against an end wall of the pan set to extend between the opposed spaced ends of the straps. The initial form of each connector is as shown in Fig. 3, but after being fitted in place its upper edge 45, previously formed with a lead, is curled outwardly, downwardly and inwardly to provide in effect a rolled bead over which the upper edge 17 of the side wall 16 at the exposed end of the pan set is adapted to be curled with its extremity 46 interlocked therewith. Below the rolled edge thus provided the connector is formed with an outwardly extending rib 47 which lies in close proximity to the rolled edge 17 thereabove.

Each end of each connector is adapted to be fitted in behind the corner extension of the outer plies 27 of one of the straps so that the ends 50 of the connectors may substantially abut the proximate ends 51 of the straps. In order that there may be interfitting of these two parts in their region of interlap, the diameter of the rib 47 is reduced at this point thereby forming a circular shoulder 52 beyond which the rib continues on, as at 53, but in a contracted cross sectional size which about corresponds with the interior of the rib 35 on the proximate strap. In addition, in the plane of the circular shoulder 52, the connector may be offset to provide a second shoulder 54 which extends straight downwardly to the lower edge of the strap. When the connector is interfitted to connect with the turned end of a strap, the rib smaller end 53 may enter the interior of the rib 35 to the point of the strap end 51 engaging the end 50 of the connector and the shoulders 52 and 54 substantially abutting the proximate end 55 of the outer ply 27 of the strap. When so interfitted, a connection, as by spot welding 56, may be made to conveniently unite the straps and connectors together permanently.

At the points where the straps lie opposite spaces between connected pans the inner plies 26 may be cut away to remove excess material. This is desirable because at such points there are no pan walls for interlocking with the straps. The upper edge 36 of the outer ply 27 may accordingly be bent inwardly and around the corresponding edge of the inner ply which I prefer to form into a reinforcing bead 60 which backs up the rib 35 that extends continuously along the outer ply. In this way a smooth upper edge for the strap is assured between the pans. Also I may project from the lower folded edge of the straps certain lugs 65, one opposite each space between adjacent pans (see Fig. 6), these lugs being struck out from the material to vacate openings 66 which, being in the inner ply, are substantially out of sight. Each lug is adapted to lie adjacent the reinforced edge of the next lower pan, when two pan sets are nested, so as to assist in centering them one with respect to the other.

Referring now to Figs. 9 and 10, the construction there shown is exactly the same as the one heretofore described except that the connectors at the ends of the pan set are each in the form of a protection plate $p$ extending downwardly to a point adjacent the bottom of the pan set where it is inwardly curved at 70 to extend toward, and desirably in engagement with, the adjacent exposed side walls at the end of the pan set. The connection which this protection plate $p$ has with the upper edge of the end wall of the pan set, plus that which is afforded by the ends of the two straps with which it is interlocked, is such as to assure a safe and steady securement of each protection plate, and it may consequently be depended upon to afford at all times the protection which is necessary or desirable for the end of the pan set.

In Figs. 11 and 12 I have exhibited another form of connector C which is associated with a strap S which at its turned end 76 (see Fig. 12) is formed with a outwardly extended horizontal rib 77 whose upper edge portion 78 is straightened out to enter into the narrow gap that intervenes between the proximate side wall 16 at the end of the pan set and its outwardly, downwardly and inwardly curled edge 17 which provides a rolled bead therefor. Within this same gap, and interlocked with this curled bead, is the upper edge portion 79 of a connector strap C, having an inner ply 80 which extends alongside of and in engagement with the proximate pan set end wall 16. Along its lower edge this connector is reversely bent at 81 to form a second ply 82 adjacent the first and then is outwardly and downwardly curved at 83 to provide an inner rib which follows around within and conforms to the contour of the inner surface of the rib 77 for which it furnishes reinforcement. Continuing on down, the connector strap then extends alongside of, and in engagement with, the proximate pan set end wall 16 at 84 through a region of lower elevation than the inner ply 80 of the same connector.

This overlap of the strap end 76 and connector

C continues through only a limited distance in the region of the section line 12—12 on Fig. 11, where a spot weld or other suitable connection may be made to join the connector to the strap end. Opposite the terminus of the strap end 76 is an abutment 85 formed on the connector. For this purpose I may hump the connector to provide a transverse shoulder, in much the same manner as has previously been described in connection with Fig. 8. Along each end of the pan set, between the strap turned ends 76 thereon, the connector continues alone, being interlocked with the rolled edge 17 of the outermost side wall of the pan at the set end, all as clearly set forth in Fig. 11.

From the preceding description it will be noted that the pan set of my invention is advantageous in numerous respects. Among other things it has solved the problem of disposing of excess material lengthwise of the strapping, arising from the latter being fitted against the inclined walls of the pans in the set and then executing a bend around the corner thereof. By providing embossments, each in the form of lugs extending transversely of the strap, this excess of material is effectively used. These lugs serve furthermore as abutments to protect the corners of the pan sets at places where they are liable to receive impacts and shocks. In practice the inclination of the ends or sides of the baking pans vary widely, depending upon the requirements of the users, consequently it is not possible to predetermine what may be the amount of surplus material to be disposed of in a strapping which is fitted flatwise against the ends and sides of such pans when combined in a set. By the means described, however, these embossed lugs may be projected out a lesser or greater distance, as required to use up the available excess material, and the shape of these lugs, as well as the extent of their projection, may be varied within wide limits. No matter what be the shape of these lugs, the excess material which is to be disposed of is adequately and effectively utilized through the provision of embossed lugs which have the special functional advantage already noted.

Another feature which adds merit to the present invention is the two-ply strapping which is extended lengthwise along the sides of the pan set and around the corners thereof. The lower edge of each such strapping, being folded, is smooth and provides an integral connection between the two plies so that there can be no separation of one from the other. The inner ply is relied upon for interlock with each of several pans for interconnection thereof, and at the same time it furnishes a reinforcement to the rolled bead at the upper edge of each pan end, this reinforcement continuing on between the pans as well. A further reinforcement is provided by the outer ply whose upper edge is fitted within the gap, resulting from the rolled edge connection between the pans and the inner ply, and assists in providing a closure therefor. By providing an outwardly extending rib parallel with and adjacent to the rolled edges of the pan, a longitudinal reinforcement is afforded to the strapping so that shocks or blows delivered against the sides of the pan set will be adequately resisted.

A simple and secure means of connecting together the sections of two-ply strapping is afforded by the connector straps at the ends of the pan set. Each of these connectors is interlocked with the rolled edge of the outermost pan side, and furnishes in addition a reinforcement to the rolled edge thereof through the provision of a longitudinally extending rib which lies closely adjacent the reinforced rolled edge at the end of the pan set. As indicated, each connector strap may, if desired, extend downwardly a distance to provide full end protection to the pan set, this being simply a matter of choice.

I claim:

1. A baking pan set in which is comprised a plurality of aligned pans each having outwardly inclined sides and ends, and means interconnecting the pans comprising a strap positioned lengthwise of the pan set, disposed flatwise of the inclined ends thereof, interlocked with one end of each pan and extended around the corners of the pan set, and lugs embossed from the strap, offset from the outer face thereof, but adjacent to the pan set corners, each lug terminating at its lower edge in substantially the same plane as the lower edge of the strap, and extending progressively outwardly of the strap toward the lower edge thereof at which point it is of maximum cross-sectional area.

2. A baking pan set in which is comprised a plurality of aligned pans each having outwardly inclined sides and ends, and means interconnecting the pans comprising a strap of two integrally connected plies extending lengthwise of the pan set and disposed with the inner ply flatwise against the inclined ends of the pans and interlocked along its free edge with one end of each pan and extended around the corners of the pan set, and lugs embossed from both plies of the strap at points offset from the outer face thereof, but adjacent to the pan set corners, each lug having a lower edge terminating in a plane substantially coincident with the lower edge of the strap and extending progressively outwardly of the strap toward the lower edge thereof at which point its protrusion is greatest.

3. A baking pan set in which is comprised a plurality of aligned pans each having outwardly inclined sides and ends, means interconnecting the pans comprising a strap bent lengthwise upon itself to provide two plies having an integral connecting fold along the bottom, the inner ply being positioned flatwise of the inclined ends of the several pans and interlocked along its upper edge with one end of each pan, the strap being extended around the corners of the pan set and having an embossment offset from the outer face thereof, but adjacent to the pan set corners, each lug having a lower edge terminating in a plane substantially coincident with the lower edge of the strap and extending progressively outwardly of the strap toward the lower edge thereof at which point its protrusion is greatest.

4. A baking pan set in which is comprised a plurality of spaced pans having aligned ends, a strap extending lengthwise of the pan set and positioned flatwise thereof, the strap being formed with a reverse bend extending longitudinally of itself to provide two plies integrally united by a fold along the strap bottom, and the upper edge of the inner ply being rolled around with the upper edge of the pan ends to provide therefor a two-ply reinforcing edge bead and between the pans being interlocked with the upper edge of the outer ply and outwardly protruded therewith to form at such points a two-ply reinforcing rib.

5. A baking pan set in which is comprised a plurality of pans having aligned ends, a strap extending lengthwise of the pan set and positioned flatwise thereof, the strap being formed with a reverse bend extending longitudinally of itself to provide two plies integrally united by a fold along the strap bottom, and adjacent parallel upper and lower reinforcements extending outwardly and lengthwise of the pan set comprising in each instance one or both of the strap plies, the upper reinforcement being two ply and discontinuous and the lower reinforcement being continuous and two ply at places.

6. A baking pan set in which is comprised a plurality of aligned pans each having outwardly inclined sides and ends, and means interconnecting the pans comprising a strap positioned around the pan set, disposed flatwise against the inclined sides and ends thereof, and bent through 90° at the corners of the pan set, and lugs outwardly embossed from the strap extending crosswise thereof and of increasing cross sectional area toward its lower edge substantially commensurate with the excess of strap material at that point resulting from the flatwise disposition of the strap against the inclined sides and ends of the pan set and around the corners thereof.

7. A baking pan set in which is comprised a plurality of pans having aligned ends, and means interconnecting the pans comprising a pair of straps one positioned lengthwise of each side of the pan set, and interlocked with one end of each pan in the set, and extended around two of the adjacent corners of the pan set, and a connector extended along each end of the pan set and in connection with the adjacent ends of the two straps, the connector being formed from a strap bent longitudinally upon itself to provide a lower folded edge and having one of its plies formed into an outward roll along its upper edge and interlocked with an outturned roll along the upper edge of the outer side of the end pan in the set, and below such point of interlock one of its plies being reversely bent in a lengthwise direction and then outwardly bowed, the other ply being also bowed in conformity therewith to provide a longitudinally extending rib two-ply adjacent to and parallel with the rolled edge of the pan side to which it is connected.

ADRIEN L. LANGEL.